United States Patent
Kishiyama et al.

(10) Patent No.: US 8,929,232 B2
(45) Date of Patent: Jan. 6, 2015

(54) TRANSMISSION POWER CONTROL METHOD AND MOBILE STATION APPARATUS

(75) Inventors: Yoshihisa Kishiyama, Tokyo (JP); Daisuke Nishikawa, Tokyo (JP); Tetsushi Abe, Tokyo (JP); Nobuhiko Miki, Tokyo (JP); Hiroyuki Ishii, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 168 days.

(21) Appl. No.: 13/261,461

(22) PCT Filed: Apr. 5, 2011

(86) PCT No.: PCT/JP2011/058570
§ 371 (c)(1),
(2), (4) Date: Jan. 8, 2013

(87) PCT Pub. No.: WO2011/125993
PCT Pub. Date: Oct. 13, 2011

(65) Prior Publication Data
US 2013/0100828 A1    Apr. 25, 2013

(30) Foreign Application Priority Data

Apr. 5, 2010   (JP) .................... 2010-087384
Aug. 16, 2010  (JP) .................... 2010-181813

(51) Int. Cl.
| H04L 1/00 | (2006.01) |
| H04W 52/24 | (2009.01) |
| H04W 52/42 | (2009.01) |
| H04W 52/14 | (2009.01) |
| H04B 7/04 | (2006.01) |

(52) U.S. Cl.
CPC ............ *H04W 52/242* (2013.01); *H04W 52/42* (2013.01); *H04W 52/146* (2013.01); *H04B 7/0486* (2013.01)
USPC ......................... 370/252; 370/318

(58) Field of Classification Search
USPC .................................. 370/252, 318
See application file for complete search history.

(56) References Cited

U.S. PATENT DOCUMENTS

| 7,489,663 B2 | 2/2009 | Ogawa et al. |
| 2011/0243007 A1* | 10/2011 | Xiao .......................... 370/252 |

FOREIGN PATENT DOCUMENTS

| JP | 2000 040988 A | 2/2000 |
| JP | 2002 094451 A | 3/2002 |

(Continued)

OTHER PUBLICATIONS

International Search Report from PCT/2011/058570 mailed on Jul. 5, 2011 (2 pages).

(Continued)

*Primary Examiner* — Sai-Ming Chan
(74) *Attorney, Agent, or Firm* — Osha Liang LLP (57) ABSTRACT

A transmission power control method and a mobile station apparatus that can adequately control the transmission power of a mobile station apparatus having multiple transmitting antennas is disclosed. The uplink transmission power control for the mobile station apparatus measures the path loss of at least one transmitting antenna, sets a representative value path loss based on the measured path loss measurement value, determines a total transmission power of the mobile station apparatus based on the representative value path loss, and determines the transmission power of each transmitting antenna by distributing the total transmission power to the transmitting antennas.

25 Claims, 6 Drawing Sheets

(56) References Cited

FOREIGN PATENT DOCUMENTS

| JP | 2008 258937 A | 10/2008 |
|---|---|---|
| JP | 2010-041379 A | 2/2010 |

OTHER PUBLICATIONS

Espacenet Abstract of JP2000040988 (A) dated Feb. 8, 2000 (1 page).
3GPP TS 36.213 V9.1.0; "3rd Generation Partnership Project; Technical Specification Group Radio Access Network; Evolved Universal Terrestrial Radio Access (E-UTRA); Physical layer procedures (Release 9)"; Mar. 2010 (79 pages).
Espacenet Abstract of JP2008258937 (A) dated Oct. 23, 2008 (1 page).
3GPP TS 36.213 V8.2.0; "3rd Generation Partnership Project; Technical Specification Group Radio Access Network; Evolved Universal Terrestrial Radio Access (E-UTRA); Physical layer procedures (Release 8)"; Mar. 2008 (30 pages).
Japanese Office Action for Application No. 2010-181813, mailed on Jul. 31, 2012 (8 pages).

\* cited by examiner

| Codebook index | 0 | 1 | 2 | 3 | 4 | 5 |
|---|---|---|---|---|---|---|
| Rank 1 | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | $\frac{1}{\sqrt{2}}\begin{bmatrix}1\\0\end{bmatrix}$ | $\frac{1}{\sqrt{2}}\begin{bmatrix}0\\1\end{bmatrix}$ |
| Rank 2 | $\frac{1}{\sqrt{2}}\begin{bmatrix}1&0\\0&1\end{bmatrix}$ | | | | | |

Columns 0–3: MULTI-ANTENNA TRANSMISSION PMI
Columns 4–5: ANTENNA SELECTION PMI

FIG. 6B

| Codebook index | 0 | 1 | 2 | 3 | 4 | 5 | 6 | 7 |
|---|---|---|---|---|---|---|---|---|
| Rank 1 | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ | $\frac{1}{\sqrt{2}}\begin{bmatrix}1\\0\end{bmatrix}$ | $\frac{1}{\sqrt{2}}\begin{bmatrix}0\\1\end{bmatrix}$ | $\begin{bmatrix}1\\0\end{bmatrix}$ | $\begin{bmatrix}0\\1\end{bmatrix}$ |
| Rank 2 | $\frac{1}{\sqrt{2}}\begin{bmatrix}1&0\\0&1\end{bmatrix}$ | | | | | | | |

Columns 0–3: MULTI-ANTENNA TRANSMISSION PMI
Columns 4–7: ANTENNA SELECTION PMI

TRANSMISSION POWER CONTROL METHOD AND MOBILE STATION APPARATUS

TECHNICAL FIELD

The present invention relates to a transmission power control method to control the uplink transmission power of a mobile station apparatus having a plurality of antennas, and a mobile station apparatus to control the transmission power of a plurality of antennas.

BACKGROUND ART

On the uplink in W-CDMA, user-specific scrambling codes are applied by way of multiplication to user apparatuses (UE: User Equipment) in the same cell to allow non-orthogonal reception, and therefore fast transmission power control (TPC) for reducing the influence of multi-user interference (that is to say, near-far problem) is essential.

In the LTE (Long Term Evolution) system defined in 3GPP Release 8 (hereinafter abbreviated as "Rel-8 LTE"), SC-FDMA (Single-Carrier Frequency Division Multiple Access) radio access, which realizes a low peak-to-average power ratio (PAPR) and which is effective to expand the coverage, is employed on the uplink. Consequently, by means of scheduling by a radio base station apparatus, a radio resource having a certain frequency and time is allocated to one UE, and therefore orthogonality is achieved between users in the same cell in the frequency and time domains. Consequently, fast TPC is not necessarily essential from the perspective of reducing multi-user interference in the same cell. However, since Rel-8 LTE is based on one-cell frequency repetition, there is significant interference from the surrounding cells, and, in particular, the interference level from UEs located at cell edges is high. Consequently, to compensate for such surrounding-cell interference and maintain certain reception quality, TPC has to be adopted in LTE as well.

The transmission power of signals transmitted on the uplink of the LTE system (including the PUSCH (Physical Uplink Shared Channel), PUCCH (Physical Uplink Control Channel) and SRS (Sounding Reference Signal)) is controlled by the combination of open-loop control, which is based on parameters (Po, α, and so on) reported from the radio base station apparatus in a comparatively long cycle and propagation loss (path loss (PL)) measured by the mobile terminal apparatus, and closed-loop control, which is based on TPC commands reported from the radio base station apparatus in a comparatively short cycle based on the situation of communication between the radio base station apparatus and the mobile terminal apparatus (reception SINR (Signal to Interference plus Noise Power Ratio)) (see, for example, non-patent literature 1).

CITATION LIST

Non-Patent Literature

Non-Patent Literature 1: 3GPP, TS36.213, V8.2.0, "Evolved Universal Terrestrial Radio Access (E-UTRA); Physical layer procedures"

SUMMARY OF INVENTION

Technical Problem

Now, in 3GPP, successor systems of LTE are being studied for the purpose of realizing further broadbandization and faster speed (for example, LTE-Advanced (LTE-A)). Although uplink transmission by a plurality of transmitting antennas of a mobile station apparatus is presumed in LTE-Advanced, in Rel-8 LTE, only transmission power control for a single transmitting antenna is defined, and there is no mention as to controlling transmission power on a per transmitting antenna basis in a mobile station apparatus having a plurality of transmitting antennas. Consequently, in uplink transmission by a plurality of transmitting antennas of a mobile station apparatus, transmission power control to fulfill the required quality is desired.

The present invention has been made in view of the above backgrounds and it is therefore an object of the present invention to provide a transmission power control method and a mobile station apparatus that can adequately control the transmission power of a mobile station apparatus having a plurality of transmitting antennas.

Solution to Problem

One transmission power control method according to the present invention is a transmission power control method to control the uplink transmission power of a mobile station apparatus having a plurality of transmitting antennas, and this transmission power control method includes the steps of: measuring path loss (PL) of at least one transmitting antenna in the plurality of transmitting antennas; setting representative value path loss (PL') based on the measured path loss (PL) measurement value; determining total transmission power ($P_{TX}$) of the mobile station apparatus based on the representative value path loss (PL'); and determining transmission power ($P_{TXn}$) of each transmitting antenna by distributing the total transmission power ($P_{TX}$) to the plurality of transmitting antennas.

According to this configuration, given transmission power control for a mobile station apparatus having a plurality of transmitting antennas on the uplink, the transmission power of each transmitting antenna is determined taking into account the variation of path loss (PL) of each transmitting antenna, so that it is possible to control transmission power adequately.

One transmission power control method according to the present invention is a transmission power control method to control uplink transmission power of a mobile station apparatus having a plurality of transmitting antennas, and this transmission power control method includes the steps of: measuring path loss (PL) of each of the plurality of transmitting antennas; and determining transmission power ($P_{TXn}$) of each transmitting antenna based on a path loss (PL) measurement value measured in each transmitting antenna.

One mobile station apparatus according to the present invention is a mobile station apparatus to include: a plurality of transmitting antennas; a path loss measurement section that measures path loss (PL) of the plurality of transmitting antennas; and a transmission power setting section that determines transmission power ($P_{TXn}$) of each transmitting antenna based on measured path loss (PL) measurement values, wherein the transmission power setting section sets representative value path loss (PL') based on the path loss (PL) measurement values measured in the path loss measurement section, determines total transmission power ($P_{TX}$) of the mobile station apparatus based on the representative value path loss (PL'), and determines transmission power ($P_{TXn}$) of each transmitting antenna by distributing the total transmission power ($P_{TX}$) to the plurality of transmitting antennas.

Technical Advantage of the Invention

According to the present invention, it is possible to adequately control the transmission power of a mobile station apparatus having a plurality of transmitting antennas.

DESCRIPTION OF EMBODIMENTS

Now, embodiments of the present invention will be described in detail with reference to the accompanying drawings.

First, transmission power control (TPC) in a single transmitting antenna will be described.

Uplink PUSCH transmission power is controlled based on following control equation 11, using the combination of open-loop TPC, which is based on parameters (Po, α and so on) reported from the base station apparatus in a comparatively long cycle and propagation loss values measured by the mobile station apparatus, and closed-loop TPC, which is based on TPC commands reported in a comparatively short cycle to correct the mid-term variation of reception level due to shadowing and setting error of transmission power of UE (3GPP, TS36.213).

$$P_{PUSCH}(i) = \min\{P_{CMAX}, 10 \log_{10}(M_{PUSCH}(i) + P_{0\_PUSCH}(j) + \alpha(j) \cdot PL + \Delta_{TF}(i) + f(i)\}$$ (Equation 11)

Here, $P_{CMAX}$ is the maximum transmission power, $M_{PUSCH}$ is the transmission bandwidth, $P_{0\_PUSCH}$ is the target received power (in the event of PL0), α is a fractional TPC weighting coefficient, PL is the path loss measurement value, $\Delta_{TF}$ is an offset that depends upon MCS, and f(i) is a correction value by a TPC command.

By defining the transmission power control (TPC) for a single transmitting antenna using above equation 11 and setting the target received power according to the path loss (PL) between the radio base station apparatus and the mobile station apparatus (realized by an open-loop control parameter α), it is possible to reduce inter-cell interference.

The present inventor has studied transmission power control for a mobile station apparatus having a plurality of transmitting antennas on the uplink, and, as result of this, arrived at the present invention by focusing on the point of controlling each transmitting antenna's transmission power by taking into account the variation of the path loss (PL) of each transmitting antenna. According to the present invention, even when the gain difference (path loss (PL) difference) varies between transmitting antennas due to the influence of human body and so on in a mobile station apparatus having a plurality of transmitting antennas, it is still possible to control transmission power taking into account the path loss (PL) difference between the plurality of transmitting antennas.

Figure 1:
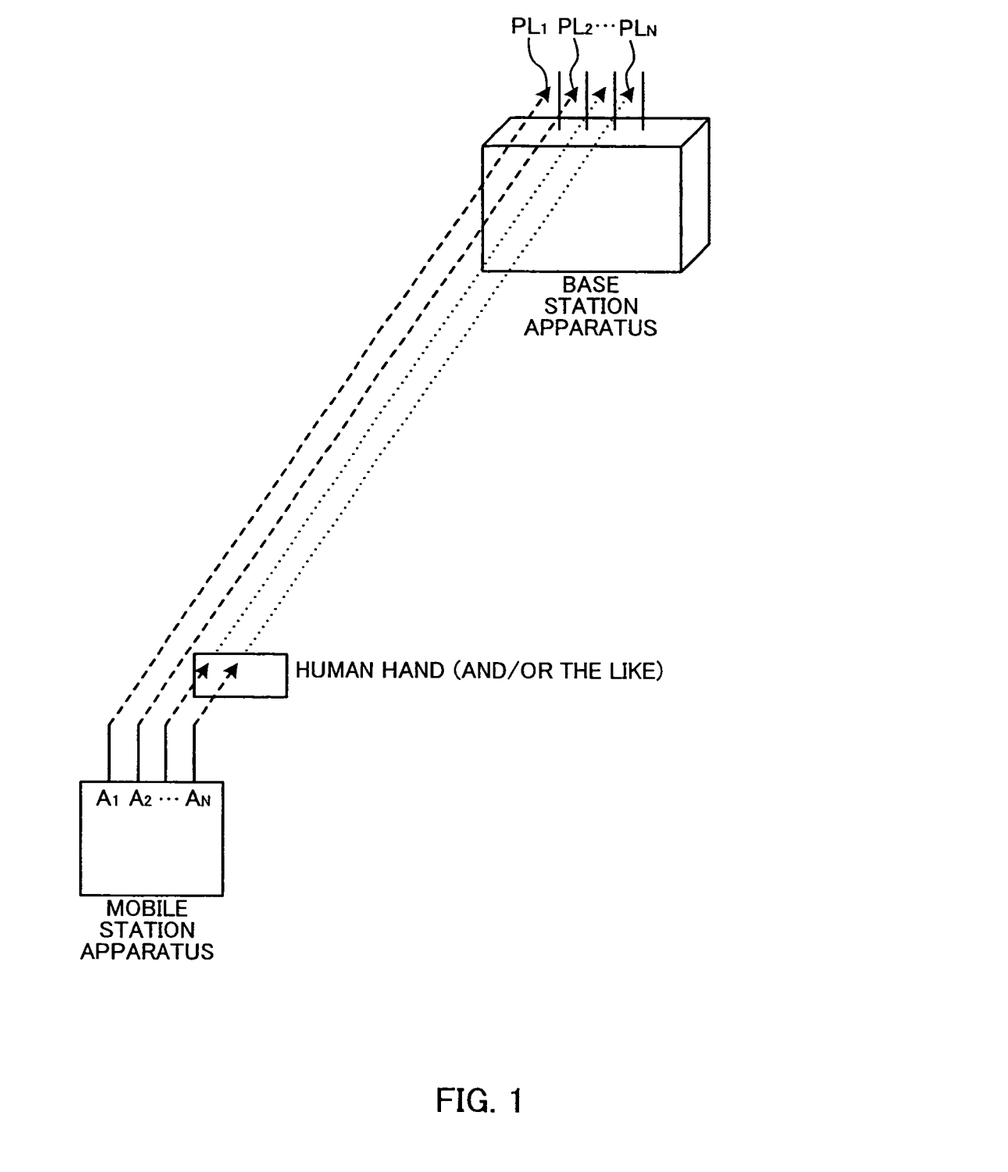
FIG. 1 is a diagram showing an embodiment of a transmission power control method according to the present invention, and is a schematic explanatory view of transmission power control of a mobile station apparatus and a base station apparatus.

FIG. 1 is a schematic view illustrating a case where transmission power control according to the present invention is applied. FIG. 1 shows a case where a mobile station apparatus having a plurality of transmitting antennas ($A_1, A_2, \ldots, A_N$) communicate with a radio station apparatus. In the mobile station apparatus having a plurality of transmitting antennas, differences are produced between the path loss measurement values ($PL_1, PL_2, \ldots, PL_N$) of the transmitting antennas due to the influence of human body and so on. Now, a transmission power control method to control each transmitting antenna's transmission power by taking into account the variation of each transmitting antenna's path loss (PL) will be described.

According to the transmission power control method of the first aspect of the present invention, the transmission power of each transmitting antenna is controlled by performing a step of measuring the path loss (PL) of at least one transmitting antenna in a plurality of transmitting antennas, a step of setting representative value path loss (PL') based on measured path loss (PL) measurement values, a step of determining the total transmission power ($P_{TX}$) of a mobile station apparatus based on the representative value path loss (PL'), and a step of determining the transmission power of each transmitting antenna by distributing the total transmission power ($P_{TX}$) to each transmitting antenna.

That is to say, according to the first aspect of the present invention, when the path loss (PL) measurement values measured in a plurality of transmitting antennas ($A_1, A_2, \ldots, A_N$), are $PL_1, PL_2, \ldots, PL_N$, respectively, representative value path loss (PL') is set from $PL_1, PL_2, \ldots$, and $PL_N$, and the transmission power of each transmitting antenna is controlled based on that PL'. Specific steps will be described below.

[Path Loss (PL) Measurement Step]

First, the path loss (PL) of a plurality of transmitting antennas provided in a mobile station apparatus is measured. Path loss (PL) can be measured in a path loss measurement section provided in the mobile station apparatus. The path loss measurement section measures the RSRP (Reference Signal Received Power) and measures the path loss (PL) of each transmitting antenna from the transmission power (Tx power) of a downlink reference signal (DLRS) that is reported in advance and the RSRP. Path loss (PL) can be measured with respect to all of a plurality of transmitting antennas or may be measured with respect to predetermined transmitting antennas. This can be selected as appropriate depending on the method of setting representative value path loss (PL') shown below.

[Representative Value Path Loss (PL') Setting Step]

Representative value path loss (PL') is set based on the measured path loss (PL) measurement values of the transmitting antennas. Representative value path loss (PL') can be set using various methods, and the method can be selected as appropriate depending on the condition of use and so on. Now, three methods will be described below as specific examples of the method of setting representative value path loss (PL').

(PL' Setting Method 1)

Assuming that the path loss (PL) measurement values measured in a plurality of transmitting antennas ($A_1, A_2, \ldots, A_N$) provided in a mobile station apparatus are $PL_1, PL_2, \ldots, PL_N$, the value given by averaging $PL_1, PL_2, \ldots, PL_N$ is made the representative value path loss (PL') (PL'=avg{$PL_1, PL_2, \ldots, PL_N$}).

According to this method, an average numerical value of the path loss (PL) measurement values of transmitting antennas is set as representative value path loss (PL').

(PL' Setting Method 2)

Assuming that the path loss (PL) measurement values measured in a plurality of transmitting antennas ($A_1, A_2, \ldots, A_N$) provided in a mobile station apparatus are $PL_1, PL_2, \ldots, PL_N$, the value of the minimum loss (the minimum PL measurement value) in $PL_1, PL_2, \ldots, PL_N$ is made the representative value path loss (PL') (PL'=min{$PL_1, PL_2, \ldots, PL_N$}).

According to this method, it is possible to exclude the increase of path loss (PL) of specific transmitting antennas due to the influence of human body and so on from determination of transmission power.

(PL' Setting Method 3)

Among a plurality of transmitting antennas ($A_1, A_2, \ldots, A_N$) provided in a mobile station apparatus, the path loss (PL) value measured in one predetermined transmitting antenna ($A_b$) is made the representative value path loss (PL') (PL'=$PL_b$).

According to this method, only the path loss (PL) of a predetermined transmitting antenna ($A_b$) in a plurality of transmitting antennas has to be measured, so that it is possible to simplify the measurement of path loss (PL).

[Total Transmission Power ($P_{TX}$) Determining Step]

The total transmission power ($P_{TX}$) of the mobile station apparatus is determined using the representative value path loss (PL') set in the above PL' setting step. To be more specific, the total transmission power ($P_{TX}$) of the mobile station apparatus is determined based on the representative value path loss (PL') that is set in one of the above-described PL' setting methods. The total transmission power ($P_{TX}$) can be determined using following equation 1.

$$P_{TX}=\min\{P\max, 10\ \log_{10}(M_{PUSCH}(i))+P_{0\_PUSCH}(j)+\alpha(j)\cdot PL'+\Delta_{TF}(i)+f(i)\}(\text{dBm}) \quad \text{(Equation 1)}$$

Here, $P_{max}$ is the maximum transmission power, $M_{PUSCH}$ is the transmission bandwidth, $P_{0\_PUSCH}$ is the target received power, $\alpha$ is a fractional TPC weighting coefficient, PL' is the representative value path loss that is set based on path loss (PL) measurement values that are measured, $\Delta_{TF}$ is an offset that depends upon MCS, and f(i) is a correction value by a TPC command.

$P_{max}$ (maximum transmission power) is determined by taking into account the maximum value of each transmitting antenna of the mobile station apparatus and the maximum value in the sum of all transmitting antennas. f(i) (correction value by a TPC command) can select the control method per transmitting antenna, or can select a control method that is common between a plurality of transmitting antennas. $M_{PUSCH}$ (transmission bandwidth), $P_{0\_PUSCH}$ (target received power), $\alpha$ (fractional TPC weighting coefficient) and $\Delta_{TF}$ (an offset that relies upon MCS) can be set with the same numerical values as in the case of Rel-8 LTE. Also, $\Delta_{TF}$ (offset that relies upon MCS) can be set to 0.

[Step of Determining Each Transmitting Antenna's Transmission Power ($P_{TXn}$)]

By distributing the total transmission power ($P_{TX}$) determined in the total transmission power ($P_{TX}$) determining step to each transmitting antenna, it is possible to determine the transmission power ($P_{TXn}$) of each transmitting antenna. The method of distributing the total transmission power ($P_{TX}$) to individual transmitting antennas can use various techniques, which can be selected as appropriate depending on the situation of use and so on. Now, two methods will be described below as specific examples of the method of determining the transmission power ($P_{TXn}$) of each transmitting antenna.

($P_{TXn}$ Determining Method 1)

The total transmission power ($P_{TX}$) determined by using above equation 1 is evenly distributed to each transmitting antenna (see equation 2).

$$P_{TXn}=P_{TX}-10\ \log_{10}N(\text{dBm}) \quad \text{(Equation 2)}$$

In equation 2, N is the number of transmitting antennas.

In the event $P_{TXn}$ determining method 1 and PL' setting method 1 are combined, it is possible to control transmission power from the perspective of averaging the variation of PL. Also, in the event $P_{TXn}$ determining method 1 and PL' setting method 2 are combined, the value of the minimum loss (the minimum PL) is used, so that it is possible to control transmission power from the perspective of excluding the increase of the path loss (PL) of specific transmitting antennas due to the influence of human body and so on, from the determination of transmission power. Also, in the event $P_{TXn}$ determining method 1 and PL' setting method 3 are combined, path loss (PL) of an arbitrary transmitting antenna is used, so that it is possible to control transmission power from the perspective of simplifying the measurement of path loss (PL).

($P_{TXn}$ Determining Method 2)

The total transmission power ($P_{TX}$) determined using above equation 1 is distributed to each transmitting antenna according to the gain difference $\Delta_n$ (see equation 3).

$$P_{TXn}=P_{TX}-\Delta_n(\text{dBm}) \quad \text{(Equation 3)}$$

As for the method of controlling the gain difference $\Delta_n$, a method of using values that are set in advance per transmitting antenna of the mobile station apparatus, a method of using values reported from the base station apparatus (by higher layer signaling, or by TPC commands in the PDCCH) and so on are applicable.

Also, in the event the total transmission power ($P_{TX}$) is distributed to each transmitting antenna in accordance with the gain difference $\Delta_n$, it is preferable to make the sum of the transmission power of each transmitting antenna after the distribution not exceed a predetermined numerical value ($P_{max}$). For this, it is necessary to make the sum of the gain differences $\Delta_n$ be 1 or greater (linear operation). For example, by making $\Delta_n=10\ \log_{10}(Y/X_n)$, design to fulfill the condition ($X_1+X_2+, \ldots, +X_N$)≤Y is provided.

Also, in the event the sum of the transmission power of each transmitting antenna after the distribution exceeds $P_{max}$, it is possible to set the total transmission power ($P_{TX}$) of the mobile station apparatus to $P_{max}$ and determine the transmission power ($P_{TXn'}$) of each transmitting antenna as follows.

$P_{TXn'}$ Determining Method 1

With $P_{TXn'}$ determining method 1, when the sum of the transmission power of each transmitting antenna after the distribution exceeds $P_{max}$, the total transmission power ($P_{max}$) of the mobile station apparatus is evenly re-distributed to each transmitting antenna (see equation 4).

$$P_{TXn'}=P_{max}-10\ \log_{10}N(\text{dBm}) \quad \text{(Equation 4)}$$

In equation 4, N is the number of transmitting antennas.

By adopting this method, compared to the method of uniformly reducing power from the power set with respect to each antenna by above equation 3 and re-setting the total transmission power ($P_{TX}$) within $P_{max}$, it is possible to set certain transmission power for an antenna of good performance (of small path loss (PL)) and compensate for communication using that antenna. In particular, in the situation where a problem with transmission is produced even when relatively large power is distributed to an antenna of large path loss (PL), it is effective to set certain transmission power with respect to antennas of small path loss (PL), upon re-setting of transmission power, as described above.

$P_{TXn'}$ Determining Method 2

In $P_{TXn'}$ determining method 2, when the sum of the transmission power of each transmitting antenna after the distribution exceeds $P_{max}$, transmission power is preferentially distributed to antennas of small path loss (PL). To be more specific, transmission power is allocated, in order, from antennas of smaller path loss (PL) in a plurality of antennas. For example, in the event the mobile station apparatus has two of the first antenna and a second antenna, power is allocated to the antenna of the smaller path loss (PL) (for example, the first antenna) until that first antenna's maximum transmission power ($P_{max\_1}$) is reached, and the rest of the transmission power is allocated to the remaining second antenna.

By adopting this method, compared to above $P_{TXn'}$ determining method 1, it is possible to preferentially compensate for the power of an antenna of good performance (where the path loss (PL) is small) and perform communication using that antenna. In this way, by allocating the transmission power to allocate to an antenna of poor performance (where the path loss (PL) is large) to an antenna of good performance (where the path loss (PL) is small), it is possible to improve the communication performance of the mobile station apparatus.

$P_{TXn'}$ Determining Method 3

In $P_{TXn'}$ determining method 3, when the sum of the transmission power of each transmitting antenna after the distribution exceeds $P_{max}$, transmission is performed using only the antenna of the minimum path loss (PL). To be more specific, power is set only with respect to the antenna of the minimum path loss (PL), and transmission power is not set with respect to the other antennas (by making transmission power 0).

By adopting this method, compared to above $P_{TXn'}$ determining methods 1 and 2, it is possible to skip the step of allocating transmission power to an antenna of poor performance (where the path loss (PL) is large), so that it is possible to simplify the step of determining each transmitting antenna's transmission power $P_{TXn}$). Also, it is possible to reduce transmission power.

Other $P_{TXn'}$ Determining Methods

As a method of determining $P_{TXn'}$, when the sum of the transmission power of each transmitting antenna after the distribution exceeds $P_{max}$, it is possible to determine each transmitting antenna's transmission power $P_{TXn'}$) using equation 5 below. With this method, even when the sum of the transmission power of each transmitting antenna after the distribution exceeds $P_{max}$, it is possible to re-set transmission power from the perspective of correcting the level difference between a plurality of transmitting antennas, $$P_{TXn'} = P_{TXn} - 10 \log_{10}(P_{over}/N)(dBm) \quad \text{(Equation 5)}$$

In equation 5, N is the number of transmitting antennas, and $P_{over}$=sum($P_{TX1}$, $P_{TX2}$, ..., $P_{TXN}$)–$P_{max}$ (linear operation) holds.

In the event $P_{TXn}$ determining method 2 and above PL' setting method 1 are combined, it is possible to control transmission power from the perspective of averaging the variation of PL and correcting the level difference between a plurality of transmitting antennas. Also, in the event $P_{TXn}$ determining method 2 and PL' setting method are combined, since the value of the minimum loss (the minimum PL) is used, so that it is possible to control transmission power from the perspective of excluding the increase of the path loss (PL) of specific transmitting antennas due to the influence of human body and so on from the determination of transmission power, and correcting the level difference between a plurality of transmitting antennas. Also, in the event $P_{TXn}$ determining method 2 and PL' setting method 3 are combined, the path loss (PL) measurement value of an arbitrary transmitting antenna is used, so that it is possible to control transmission power from the perspective of simplifying PL measurement and also correcting the level difference between a plurality of transmitting antennas.

Also, in $P_{TXn}$ determining method 2, in the event the sum of the transmission power of each transmitting antenna is anticipated to exceed P it is possible to provide a configuration to report a PMI (Precoding Matrix Indicator) for antenna selection from the base station apparatus to the mobile station apparatus. For example, when the number of transmitting antennas is two, it is possible to use the codebooks shown in FIG. 6.

Figure 6A:
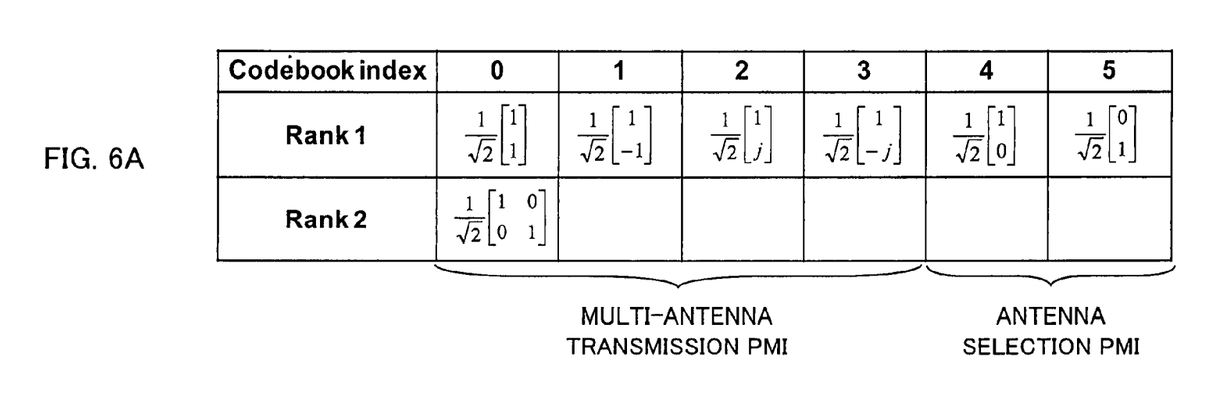
FIG. 6 is a diagram showing an example of codebook applied to transmission power control according to the present invention.

FIG. 6A shows codebooks of two transmitting antennas defined in 3GPP (3GPP, TR36.814). The codebook indices 4 and 5 are equivalent to antenna selection PMIs. The mobile station apparatus selects an antenna selection PMI (index 4 or 5) taking into account the path loss of two transmitting antennas, so that it is possible to provide a configuration to set power only with respect to the antenna of the minimum PL, and not set power with respect to the other antenna (above $P_{TXn'}$ determining method 3).

Figure 6B:
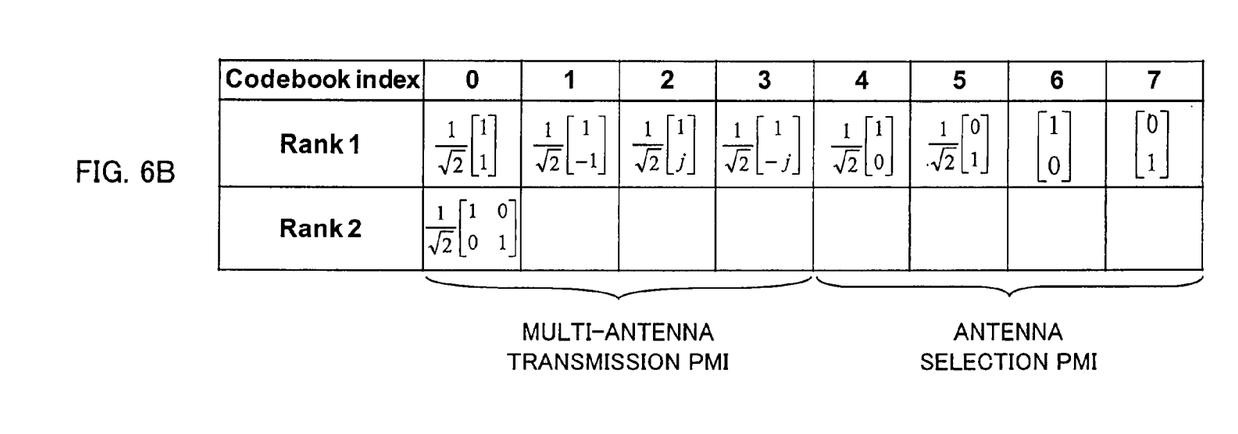

Note that, with the codebooks shown in FIG. 6A, transmission power is limited to half by $1/\sqrt{2}$ in the antenna selection PMIs (indices 4 and 5), so that it is preferable to use codebooks in which PMIs that do not limit the transmission power of antennas to be selected are provided (see FIG. 6B). In this case, the mobile station apparatus selects an antenna selection PMI in FIG. 6B (index 6 or 7) taking into account the path loss of two transmitting antennas, so that it is possible to provide a configuration to set power in an unlimited manner only with respect to the antenna of the minimum PL, and not set power with respect to the other antenna.

Next, a transmission power control method according to another aspect of the present invention will be described.

With the transmission power control method of a second aspect of the present invention, the transmission power of each transmitting antenna is controlled by performing a step of measuring the path loss (PL) of a plurality of transmitting antennas and a step of determining the transmission power ($P_{TXn}$) of each transmitting antenna based on the path loss (PL) measurement value measured in each transmitting antenna.

That is to say, according to the second aspect, assuming that the path loss (PL) measurement values measured in a plurality of transmitting antennas ($A_1, A_2, \ldots, A_N$) are $PL_1$, $PL_2, \ldots, PL_N$, respectively, each transmitting antenna's transmission power is controlled by taking into account $PL_1$, $PL_2, \ldots, PL_N$ measured on a per transmitting antenna basis. Specific steps will be described below.

[Path Loss (PL) Measurement Step]

First, the path loss (PL) of a plurality of transmitting antennas provided in a mobile station apparatus is measurement. Path loss (PL) can be measured in a path loss measurement section provided in the mobile station apparatus. The path loss measurement section measures the RSRP (Reference Signal Received Power) and measures the path loss (PL) of each transmitting antenna from the transmission power (Tx power) of a downlink reference signal (DLRS) that is reported in advance and the RSRP.

[Step of Determining Each Transmitting Antenna's Transmission Power ($P_{TXn}$)]

Based on the PL (=$PL_n$) measurement value of each transmitting antenna measured in the PL value measurement step, each transmitting antenna's transmission power ($P_{TXn}$) is determined. $P_{TXn}$ can be determined using various methods, and the method can be selected as appropriate depending on the condition of use and so on. Now, three methods will be described below as methods of determining the transmission power ($P_{TXn}$) of each transmitting antenna.

($P_{TXn}$ Determining Method 1)

Based on each transmitting antenna's PL (=$PL_n$) measurement value, the transmission power ($P_{TXn}$) of each transmitting antenna is determined using equation 6 below. Here, the maximum transmission power is defined per transmitting antenna.

$$P_{TXn} = \min\{P_{max\_n}, 10 \ \log_{10}(M_{PUSCH})) + P_{0\_PUSCH} + \alpha(j) \cdot PL_n \alpha \Delta_{TF}(i) + f(i) - 10 \log_{10} N\}(\text{dBm}) \quad \text{(Equation 6)}$$

In equation 6, $P_{max\_n}$ is the maximum transmission power of each transmitting antenna.

According to this method, the path loss (PL) of each transmitting antenna is the open-loop TPC standard, and the reception level differences can be corrected to a certain degree. Also, it is possible to control transmission power from the perspective of handling each transmitting antenna like an individual mobile station apparatus.

($P_{TXn}$ Determining Method 2)

$P_{TXn}$ determining method 2 is a method to define the maximum transmission power of the mobile station apparatus by the sum of all transmitting antennas in above $P_{TXn}$ determining method 1.

Each transmitting antenna's transmission power $P_{TXn}$ is determined using above equation 6. Note that $P_{max\_n} = P_{max}$ may hold. Also, in the event the sum of the transmission power of each transmitting antenna exceeds $P_{max}$ it is possible to set the total transmission power ($P_{TX}$) of the mobile station apparatus to $P_{max}$ and determine each transmitting antenna's transmission power ($P_{TXn'}$) as follows:

$P_{TXn'}$ Determining Method 1

In $P_{TXn'}$ determining method 1, when the sum of the transmission power of each transmitting antenna after the distribution exceeds $P_{max}$, the total transmission power ($P_{max}$) of the mobile station apparatus is evenly distributed to each transmitting antenna (see equation 7).

$$P_{TXn'} = P_{max} - 10 \log_{10} N (\text{dBm}) \quad \text{(Equation 7)}$$

In equation 7, N is the number of transmitting antennas.

By adopting this method, compared to the method of uniformly reducing power from the power set with respect to each antenna by above equation 6 and re-setting the total transmission power ($P_{TX}$) within $P_{max}$, it is possible to set certain transmission power for an antenna of good performance (of small path loss (PL)) and compensate for communication using that antenna. In particular, in the situation where a problem with transmission is produced even when relatively large power is distributed to an antenna of large path loss (PL), it is effective to set certain transmission power with respect to antennas of small path loss (PL), upon re-setting of transmission power, as described above.

$P_{TXn'}$ Determining Method 2

In $P_{TXn'}$ determining method 2, when the sum of the transmission power of each transmitting antenna after the distribution exceeds $P_{max}$, transmission power is preferentially distributed to antennas of small path loss (PL). To be more specific, transmission power is allocated, in order, from antennas of smaller path loss (PL) in a plurality of antennas. For example, in the event the mobile station apparatus has two of the first antenna and a second antenna, power is allocated to the antenna of the smaller path loss (PL) (for example, the first antenna) until that first antenna's maximum transmission power ($P_{max\_1}$) is reached, and the rest of the transmission power is allocated to the remaining second antenna.

By adopting this method, compared to above $P_{TXn'}$ determining method 1, it is possible to preferentially compensate for the power of an antenna of good performance (where the path loss (PL) is small) and perform communication using that antenna. In this way, by allocating the transmission power to allocate to an antenna of poor performance (where the path loss (PL) is large) to an antenna of good performance (where the path loss (PL) is small), it is possible to improve the communication performance of the mobile station apparatus.

$P_{TXn'}$ Determining Method 3

In $P_{TXn'}$ determining method 3, when the sum of the transmission power of each transmitting antenna after the distribution exceeds $P_{max}$, transmission is performed using only the antenna of the minimum path loss (PL). To be more specific, power is set only with respect to the antenna of the minimum path loss (PL), and transmission power is not set with respect to the other antennas (by making transmission power 0).

By adopting this method, compared to above $P_{TXn'}$ determining methods 1 and 2, it is possible to skip the step of allocating transmission power to an antenna of poor performance (where the path loss (PL) is large), so that it is possible to simplify the step of determining each transmitting antenna's transmission power ($P_{TXn}$). Also, it is possible to reduce transmission power.

Other $P_{TXn'}$ Determining Methods

As a method of determining $P_{TXn'}$, when the sum of the transmission power of each transmitting antenna after the distribution exceeds $P_{max}$, it is possible to determine each transmitting antenna's transmission power ($P_{TXn'}$) using equation 8 below. With this method, even when the sum of the transmission power of each transmitting antenna after the distribution exceeds $P_{max}$, it is possible to re-set transmission power from the perspective of correcting the level difference between a plurality of transmitting antennas, $$P_{TXn'} = P_{TXn} - 10 \log_{10}(P_{over}/N)(\text{dBm}) \quad \text{(Equation 8)}$$

In equation 8, N is the number of transmitting antennas, and $P_{over} = \text{sum}(P_{TX1}, P_{TX2}, \ldots, P_{TXN}) - P_{max}$ (linear operation) holds.

Also, in $P_{TXn}$ determining method 2 according to the second aspect of the present invention, in the event the sum of the transmission power of each transmitting antenna is anticipated to exceed $P_{max}$, it is possible to provide a configuration to report a PMI (Precoding Matrix Indicator) for antenna selection from the base station apparatus to the mobile station apparatus.

($P_{Txn}$ Determining Method 3)

Representative value path loss (PL') is set based on the path loss (PL) measurement values of transmitting antennas that are measured, each transmitting antenna's transmission power ($P_{TXn}$) is corrected based on the path loss difference ($PL_n - PL'$) from the representative value path loss (PL'), and each transmitting antenna's transmission power ($P_{TXn}$) is determined.

The representative value path loss (PL') can be determined using any of the three PL' setting methods described above in relationship to the transmission power control method of the first aspect. Then, based on the representative value path loss (PL') determined, each transmitting antenna's transmission power ($P_{TXn}$) is determined according to following equation 9 and equation 10:

$$P_{TXb} = \min\{P_{max\_n}, 10\log_{10}(M_{PUSCH}(i)) + P_{0\_PUSCH}(j) + \alpha(j) \cdot PL_b + \Delta_{TF}(i) + f(i) - 10\log_{10}N\} \text{(dBm)} \quad \text{(Equation 9)}$$

$$P_{TXn} = P_{TXb} + \beta(PL_n - PL') \quad \text{(Equation 10)}$$

Here, β is a weighting coefficient, and is controlled such that each transmitting antenna has equal average reception power when β=1.

Also, in the event the sum of the transmission power of all transmitting antennas exceeds $P_{max}$, the total transmission power of the mobile station apparatus has only to be suppressed to $P_{max}$ by the same method (equation 7 or equation 8) as above $P_{TXn}$ determining method 2.

According to this method, it is possible to control transmission power from the perspective of correcting the level difference between a plurality of transmitting antennas with high accuracy.

Now, configurations of a mobile station apparatus and a base station apparatus when the transmission power control method shown in the first aspect or second aspect of the present invention will be described below.

Figure 2:
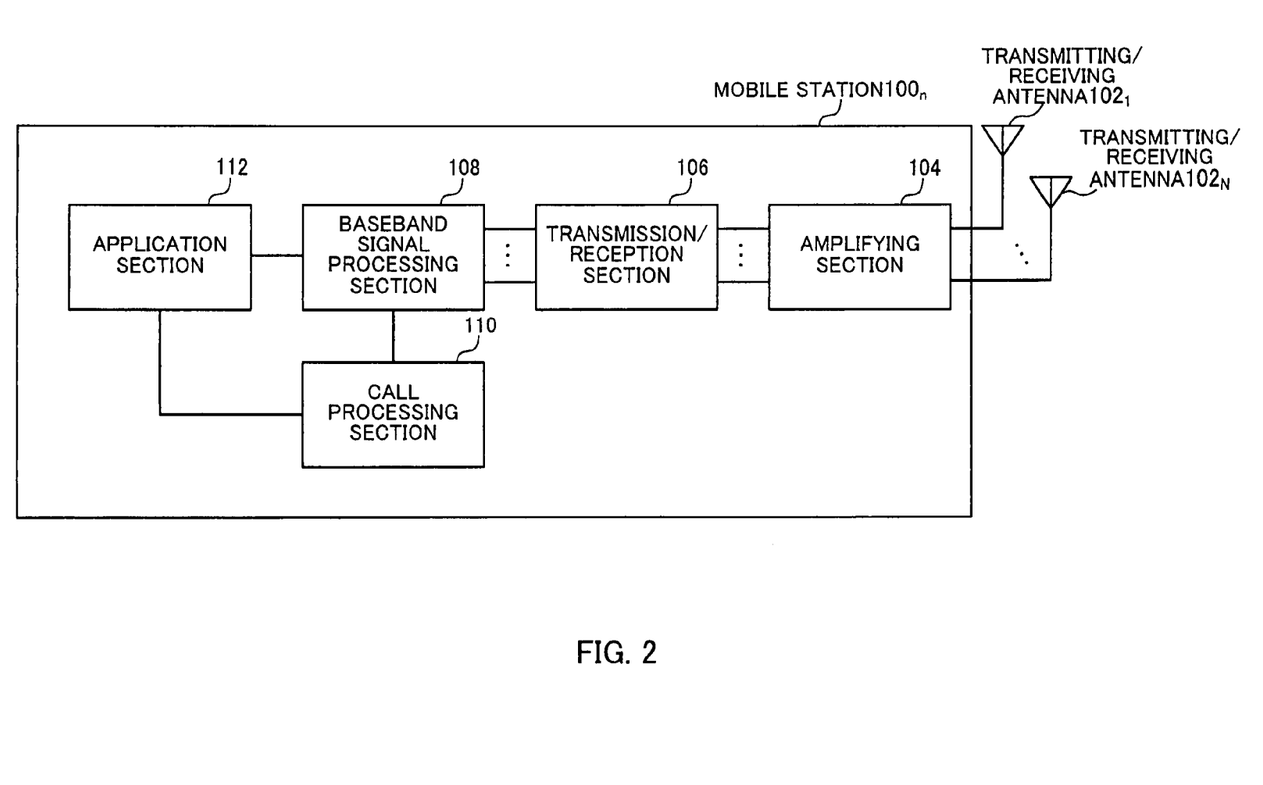
FIG. 2 is a diagram showing an embodiment of a transmission power control method according to the present invention, and is a functional block diagram of a mobile station apparatus.

The functional configuration of the mobile station apparatus will be described with reference to FIG. 2. FIG. 2 is a functional block diagram of a mobile station apparatus according to an embodiment of the present invention.

As shown in FIG. 2, a mobile station apparatus 100$_n$ is formed with a plurality of transmitting/receiving antennas 102$_1$ to 102$_N$, an amplifying section 104 corresponding to the transmitting/receiving antennas 102$_1$ to 102$_N$, a transmission/reception section 106, a baseband signal processing section 108, a call processing section 110, and an application section 112.

Uplink data is input in the baseband signal processing section 108, from the application section 112. In the baseband signal processing section 108, the retransmission control (H-ARQ (Hybrid ARQ)) process, scheduling, transport format selection, channel coding, transmission power setting and so on are performed, and the result is transferred to the transmission/reception section 106 per transmitting antenna. The transmission/reception section 106 performs frequency conversion of a baseband signal output from the baseband signal processing section 108, into a radio frequency signal. The signal having been subjected to frequency conversion is later amplified in the amplifying section 104 and transmitted from each of the transmitting/receiving antennas 102$_1$ to 102$_N$.

Regarding downlink data, a radio frequency signal that is received in the transmitting/receiving antennas 102$_1$ to 102$_N$ is amplified in the amplifying section 104 such that the received power is corrected to certain power under AGC (Auto Gain Control). The amplified radio frequency signal is subjected to frequency conversion into a baseband signal, in the transmission/reception section 106. This baseband signal is subjected to predetermined processes (error correction, decoding, and so on) in the baseband signal processing section 108, and later transferred to the call processing section 110 and application section 112.

The call processing section 110 manages communication with the radio base station apparatus, and the application section 112 performs processes related to layers higher than the physical layer or the MAC layer.

Figure 3:
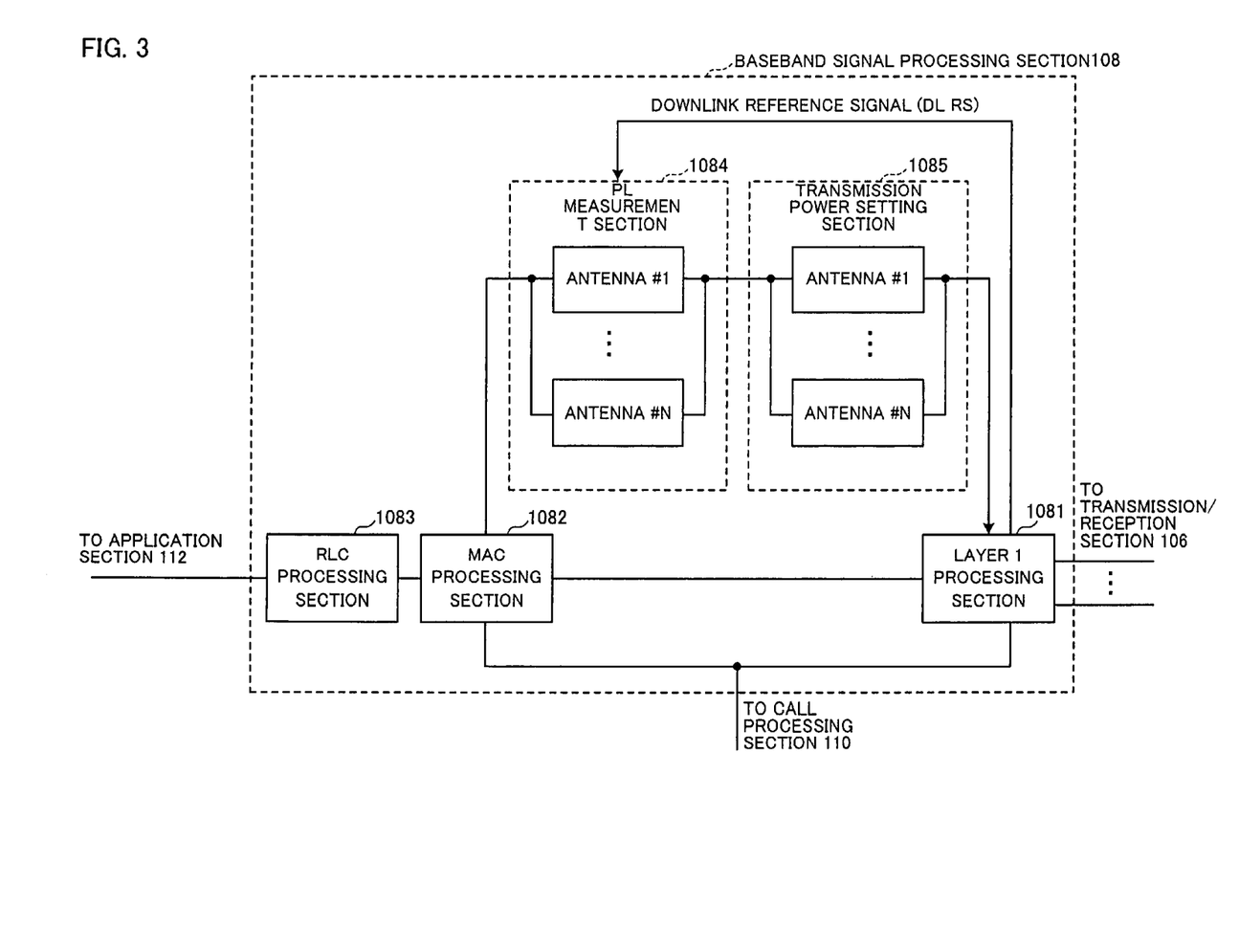
FIG. 3 is a diagram showing an embodiment of the transmission power control method according to the present invention, and is a functional block diagram of a baseband signal processing section of a mobile station apparatus.

Next, a functional configuration of the baseband signal processing section in the mobile station apparatus will be described with reference to FIG. 3. FIG. 3 is a functional block diagram of the baseband signal processing section provided in the mobile station apparatus.

The baseband signal processing section 108 includes a layer 1 processing section 1081, a MAC processing section 1082, an RLC processing section 1083, a PL measurement section 1084, and a transmission power setting section 1085.

The layer 1 processing section 1081 mainly performs processes related to the physical layer. The layer 1 processing section 1081, for example, performs processes for a signal that is received on the downlink, including channel decoding, discrete Fourier transform (DFT), frequency demapping, inverse Fourier transform (IFFT), data demodulation and so on. Also, the layer 1 processing section 1081 performs processes for a signal to transmit on the uplink, including channel coding, data modulation, frequency mapping and inverse Fourier transform (IFFT).

The MAC processing section 1082 performs retransmission control in the MAC layer (HARQ), analysis of downlink scheduling information for the downlink (including specifying the PDSCH transport format and specifying the PDSCH resource blocks) and so on, for a signal received on the downlink. Also, the MAC processing section 1082 performs MAC retransmission control, analysis of uplink scheduling information (including specifying the PUSCH transport format and specifying the PUSCH resource blocks) and so on, for a signal to transmit on the uplink.

The RLC processing section 1083 performs, for a packet to receive on the uplink and a packet to receive from the application section 112 and transmit on the downlink, packet division, packet combining, retransmission control in the RLC layer and so on.

The PL measurement section 1084 measures the RSRP (Reference Signal Received Power) and measures the path loss (PL) of each antenna from the transmission power (Tx-power) of the downlink reference signal (DLRS) that is reported in advance, and the RSRP.

Based on the path loss (PL) measurement values measured in the PL measurement section 1084, the transmission power setting section 1085 sets each antenna's transmission power by setting the representative value path loss (PL') to use in transmission power control for each antenna and the path loss (PL) measurement values to use in transmission power control for each antenna. Setting of the representative value path loss (PL') to use in transmission power control and setting of each antenna's transmission power can use the methods shown with respect to the first aspect or second aspect of the present invention. Also, in the event the sum of the transmission power of each transmitting antenna after the distribution exceeds $P_{max}$, the total transmission power ($P_{TX}$) of the mobile station apparatus is set to $P_{max}$ and each transmitting antenna's transmission power ($P_{TXn}$) is set using $P_{TXn'}$ determining methods 1 to 3 and so on. In the event $P_{TXn'}$ determining method 3 is applied, it is possible to provide a configuration in which the mobile station apparatus selects an antenna selection PMI from the codebooks shown in above FIG. 6.

In the event the transmission power control method of the first aspect of the present invention is adopted in the transmission power setting section 1085, the transmission power setting section 1085 performs a step of setting the representative value path loss (PL') based on the measured path loss (PL) measurement values, a step of determining the total transmission power ($P_{TX}$) of the mobile station apparatus based on the representative value path loss (PL'), and a step of determining the transmission power of each transmitting antenna by distributing the total transmission power ($P_{TX}$) to each transmitting antenna. For example, in the path loss measurement values of the transmitting antennas measured in the PL measurement section 1084, after the value of the minimum PL measurement value is set as the representative value path loss (PL') and the total transmission power ($P_{TX}$) is determined using above equation 1, the total transmission power ($P_{TX}$) is evenly distributed to each transmitting antenna. In this case, although above PL' setting method 2 and $P_{TXn}$ determining method 1 according to the first aspect are adopted, this is by no means limiting, and it is equally possible to adopt other PL' setting methods and $P_{TXn}$ determining methods.

In the event the transmission power control method according to the second aspect of the present invention is adopted in the transmission power setting section 1085, the transmission power setting section 1085 performs a step of determining each transmitting antenna's transmission power ($P_{TXn}$) based on the path loss (PL) measurement value measured in each transmitting antenna. For example, based on the PL ($=PL_n$) measurement value of each transmitting antenna measured in the PL measurement section 1084, the transmission power ($P_{TXn}$) of each transmitting antenna is determined using above equation 6. In this case, although above $P_{TXn}$ determining method 1 according to the second aspect is adopted, this is by no means limiting, and it is equally possible to adopt other $P_{TXn}$ determining methods.

Figure 4:
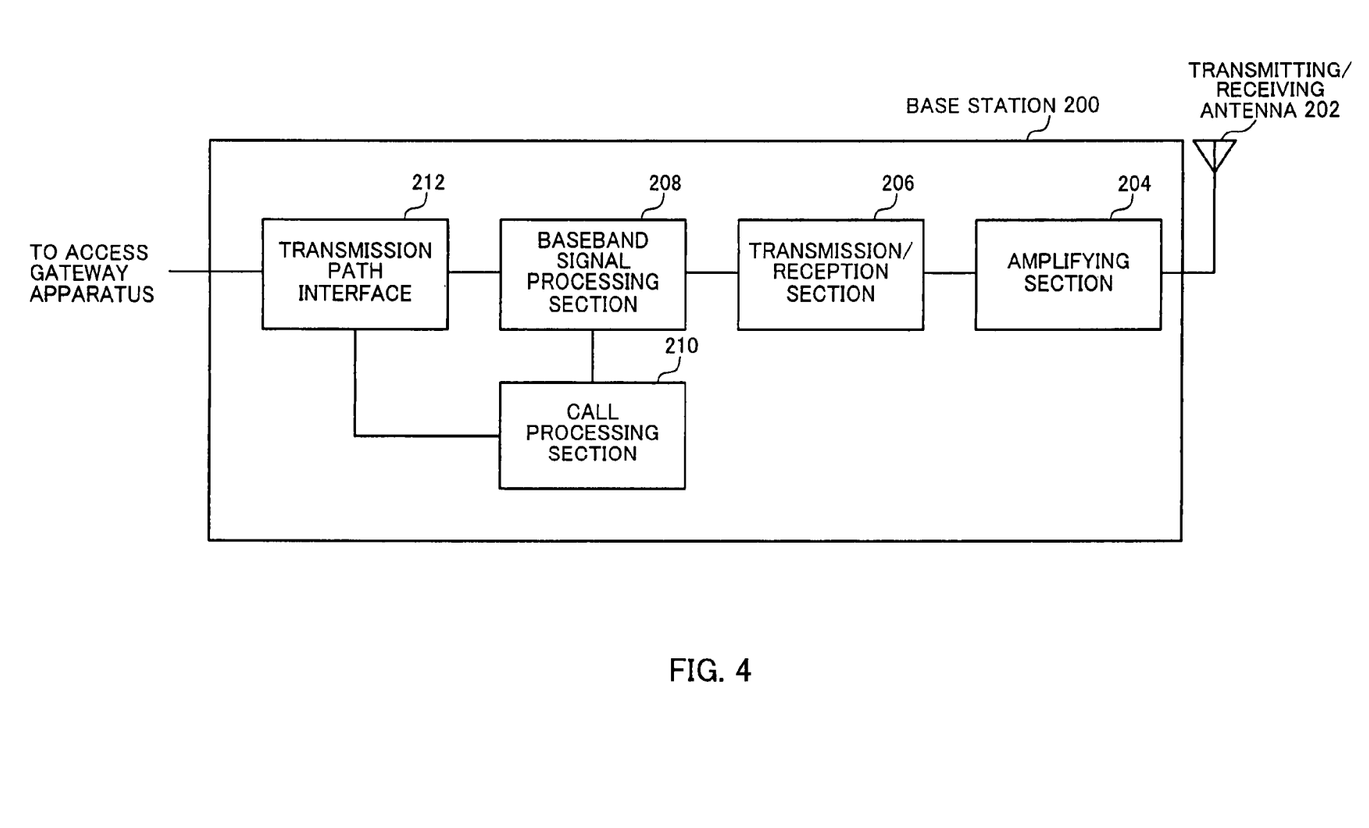
FIG. 4 is a diagram showing an embodiment of a transmission power control method according to the present invention and is a functional block diagram of a base station apparatus.

Next, the functional configuration of the base station apparatus will be described with reference to FIG. 4. FIG. 4 is a functional block diagram of a base station apparatus according to an embodiment of the present invention.

As shown in FIG. 4, a base station apparatus 200 is formed with a plurality of transmitting/receiving antennas 202 (only one is shown), an amplifying section 204, a transmission/reception section 206, a baseband signal processing section 208, a call processing section 210, and a transmission path interface 212.

Regarding uplink data, a radio frequency signal that is received in the transmitting/receiving antennas 202 is amplified in the amplifying section 204 to correct the received power to certain power under AGC. The amplified radio frequency signal is subjected to frequency conversion into a baseband signal, in the transmission/reception section 206. This baseband signal is subjected to predetermined processes (error correction, decoding, and so on) in the baseband signal processing section 208, and transferred to an access gateway apparatus (not shown) via the transmission path interface 212. The access gateway apparatus is connected to the core network, and manages each mobile station apparatus.

Downlink data is input in the baseband signal processing section 208, from a higher apparatus, via the transmission path interface 212. In the baseband signal processing section 208, the retransmission control (H-ARQ (Hybrid ARQ)) process, scheduling, transport format selection, channel coding and so on are performed, and the result is transferred to the transmission/reception section 206. The transmission/reception section 206 performs frequency conversion of the baseband signal output from the baseband signal processing section 208, into a radio frequency signal. The signal having been subjected to frequency conversion is later amplified in the amplifying section 204 and transmitted from the transmitting/receiving antennas 202.

The call processing section 210 transmits and receives a call process control signal to and from a radio control station of a higher apparatus, manages the state of the radio base station apparatus 200, and allocates resources. Note that the processes in the layer 1 processing section 2081 and MAC processing section 2082 are performed based on the state of communication between the base station apparatus 200 and the mobile station apparatus $100_n$ set in the call processing section 210.

Figure 5:
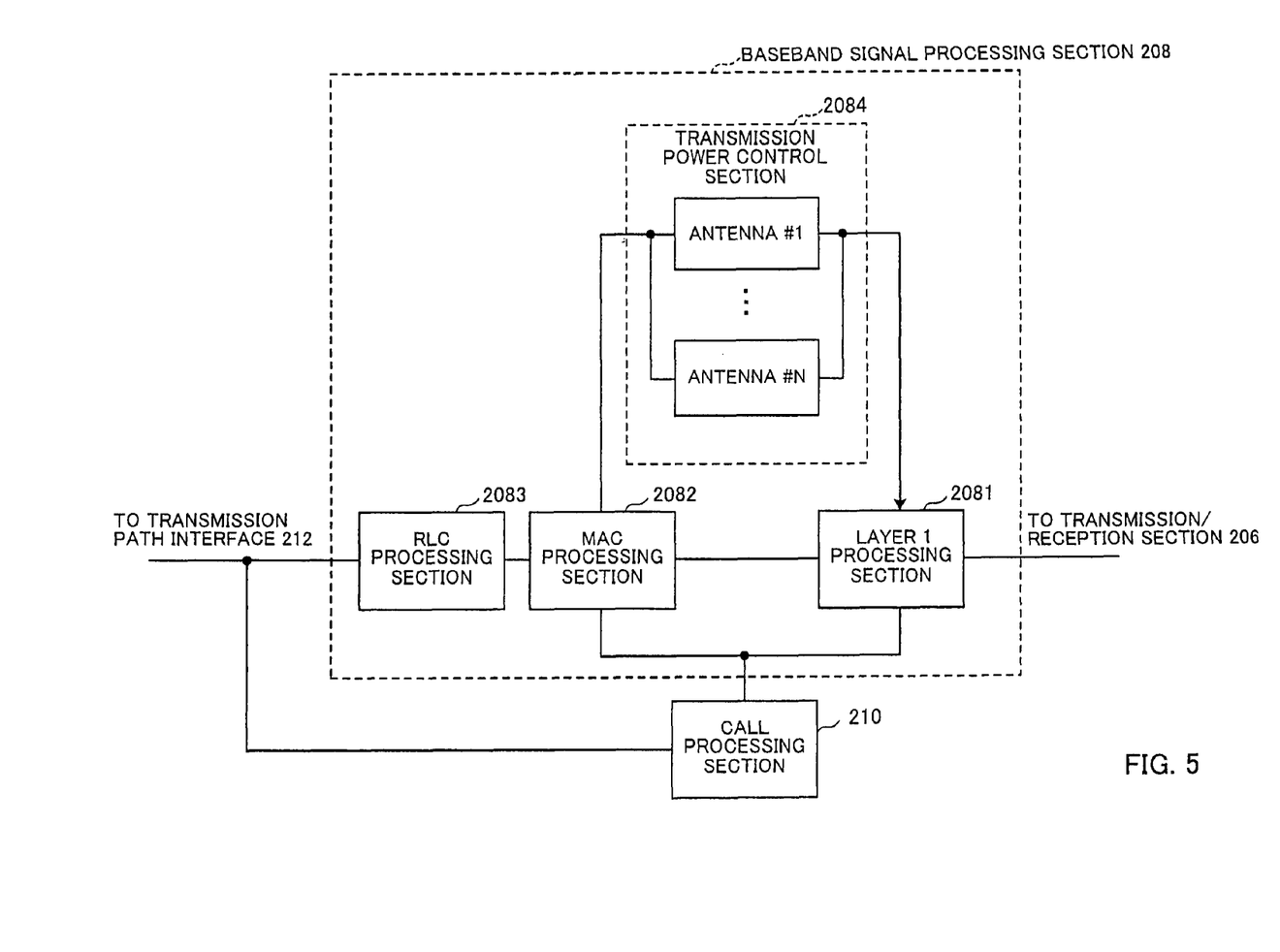
FIG. 5 is a diagram showing an embodiment of a transmission power control method according to the present invention, and is a functional block diagram of a baseband signal processing section of a base station apparatus.

Next, the functional configuration of the baseband processing section will be described with reference to FIG. 5. FIG. 5 is a functional block diagram of a baseband processing section in the radio base station apparatus As shown in FIG. 5, the baseband signal processing section 208 is formed with a layer 1 processing section 2081, a MAC (Medium Access Control) processing section 2082, an RLC processing section 2083, and a transmission power control section 2084.

The layer 1 processing section 2081 mainly performs processes related to the physical layer. The layer 1 processing section 2081, for example, performs processes for a signal that is received on the uplink, including channel decoding, discrete Fourier transform (DFT), frequency demapping, inverse Fourier transform (IFFT), data demodulation and so on. Also, the layer 1 processing section 2081 performs processes for a signal to transmit on the downlink, including channel coding, data modulation, frequency mapping and inverse Fourier transform (IFFT).

The MAC processing section 2082 performs processes for the signal received on the uplink, such as retransmission control (HARQ) in the MAC layer, scheduling for the uplink/downlink, transport format selection for the PUSCH/PDSCH, resource block selection for the PUSCH/PDSCH, and so on.

The RLC processing section 2083 performs, for a packet received on the uplink/a packet to transmit on the downlink, packet division, packet combining, retransmission control in the RLC layer, and so on.

The transmission power control section 2084 manages the transmission power information of the mobile station apparatus, and sets and reports the TPC command. Also, considering the gain difference between the antennas of the mobile station apparatus, TPC commands are reported to the mobile station apparatus in higher layer signaling or the PDCCH. Note that correction value (f(i)) by the TPC command is controlled in the mobile station apparatus per transmitting antenna or controlled in common between a plurality of transmitting antennas. Also, in the event the sum of the transmission power of each transmitting antenna after the distribution is anticipated to exceed $P_{max}$, it is also possible to report antenna selection PMIs to the mobile station apparatus.

As described above, according to the transmission power control method of the present embodiment, even when a mobile station apparatus has a plurality of transmitting antennas, it is possible to adequately control uplink transmission power by controlling transmission power taking into account each transmitting antenna's path loss (PL).

Also, the embodiments disclosed herein are only examples in all respects, and are by no means limited to these embodiments. The scope of the present invention is defined not only by the descriptions of the above embodiments and also is set by the claims, and covers all the modifications and alterations within the meaning and range equivalent to the claims.

INDUSTRIAL APPLICABILITY

As described earlier, the present invention brings about an advantage of making it possible to adequately control the transmission power of a mobile station having a plurality of transmitting antennas and is particularly suitable for use for a transmission power control method, a base station apparatus and a mobile station apparatus to control transmission power on the uplink.

The disclosure of Japanese Patent Application No. 2010-087384, filed on Aug. 16, 2010, including the specification, drawings, and abstract, is incorporated herein by reference in its entirety.

The invention claimed is:

1. A transmission power control method to control uplink transmission power of a mobile station apparatus having a plurality of transmitting antennas, the transmission power control method comprising the steps of:
measuring path loss (PL) of at least one transmitting antenna in the plurality of transmitting antennas;
setting representative value path loss (PL') based on the measured path loss (PL) measurement value;
determining total transmission power ($P_{TX}$) of the mobile station apparatus based on the representative value path loss (PL'); and
determining transmission power ($P_{TXn}$) of each transmitting antenna by distributing the total transmission power ($P_{TX}$) to the plurality of transmitting antennas,
wherein the total transmission power ($P_{TX}$) is determined by following equation 1:

$$P_{TX}=\min\{P_{max}, 10\log_{10}(M_{PUSCH}(i))+P_{0\_PUSCH}(j)+\alpha(j)\cdot PL'+\Delta_{TF}(i)+f(i)\}(\text{decibels-milliwatt dBm})) \quad (\text{Equation 1})$$

where $P_{max}$ is maximum transmission power, $M_{PUSCH}$ is a transmission bandwidth, $P_{0\_PUSCH}$ is target received power, $\alpha$ is a fractional TPC weighting coefficient, PL' is representative value path loss (PL') that is set based on a measured a path loss (PL) measurement value, $\Delta_{TF}$ is an offset that relies upon MCS, and f(i) is a correction value by a TPC command.

2. The transmission power control method as defined in claim 1, wherein the representative value path loss (PL') is an average value of path loss (PL) measurement values of the plurality of transmitting antennas.

3. The transmission power control method as defined in claim 1, wherein the representative value path loss (PL') is a minimum path loss (PL) measurement value in path loss (PL) measurement values of the plurality of transmitting antennas.

4. The transmission power control method as defined in claim 1, wherein the representative value path loss (PL') is a path loss (PL) measurement value of one predetermined transmitting antenna in the plurality of transmitting antennas.

5. The transmission power control method as defined in claim 1, wherein the total transmission power ($P_{TX}$) is evenly distributed to each of the plurality of transmitting antennas.

6. The transmission power control method as defined in claim 1, wherein the total transmission power ($P_{TX}$) is distributed according to a gain difference of each of the plurality of transmitting antennas.

7. The transmission power control method as defined in claim 6, wherein, when a sum of the transmission power ($P_{TXn}$) of each transmitting antenna exceeds $P_{max}$, the total transmission power ($P_{TX}$) is made $P_{max}$ and the transmission power ($P_{TXn'}$) of each transmitting antenna is determined using following equation 4:

$$P_{TXn'}=P_{max}-10\log_{10}N(\text{dBm}) \quad (\text{Equation 4})$$

where N is the number of transmitting antennas.

8. The transmission power control method as defined in claim 6, wherein, when a sum of the transmission power ($P_{TXn}$) of each transmitting antenna exceeds a predetermined value ($P_{max}$), the total transmission power ($P_{TX}$) is made $P_{max}$, and $P_{max}$ is preferentially distributed to an antenna where path loss (PL) is small in the plurality of transmitting antennas.

9. The transmission power control method as defined in claim 6, wherein, when a sum of the transmission power ($P_{TXn}$) of each transmitting antenna exceeds a predetermined value ($P_{max}$), the total transmission power ($P_{TX}$) is made $P_{max}$, and power is set only with respect to an antenna of minimum path loss (PL) in the plurality of transmitting antennas.

10. A transmission power control method to control uplink transmission power of a mobile station apparatus having a plurality of transmitting antennas, the transmission power control method comprising the steps of:
measuring path loss (PL) of each of the plurality of transmitting antennas; and
determining transmission power ($P_{TXn}$) of each transmitting antenna based on a path loss (PL) measurement value measured in each transmitting antenna,
wherein the transmission power ($P_{TXn}$) of each transmitting antenna is determined by following equation 6:

$$P_{TXn}=\min\{P_{max\_n}, 10\log_{10}(M_{PUSCH}(i))+P_{0\_PUSCH}(j)+\alpha(j)\cdot PL_n+\Delta_{TF}(i)+f(i)-10\log_{10}N\}(\text{decibels-milliwatt dBm})) \quad (\text{Equation 6})$$

where $P_{max\_n}$ is maximum transmission power of each transmitting antenna,
$M_{PUSCH}$ is a transmission bandwidth, $P_{0\_PUSCH}$ is target received power, $\alpha$ is a fractional TPC weighting coefficient, $\Delta_{TF}$ is an offset that relies upon MCS, and f(i) is a correction value by a TPC command.

11. The transmission power control method as defined in claim 10, wherein, when a sum of the transmission power of the plurality of transmitting antennas exceeds a predetermined value ($P_{max}$), the total transmission power ($P_{TX}$) of the mobile station apparatus is made $P_{max}$ and the transmission power ($P_{TXn'}$) of each transmitting antenna is determined using following equation 7:

$$P_{TXn'}=P_{max}-10\log_{10}N(\text{dBm}) \quad (\text{Equation 7})$$

where N is the number of transmitting antennas.

12. The transmission power control method as defined in claim 10, wherein, when a sum of the transmission power ($P_{TXn}$) of each transmitting antenna exceeds a predetermined value ($P_{max}$), the total transmission power ($P_{TX}$) is made $P_{max}$, and $P_{max}$ is preferentially distributed to an antenna where path loss (PL) is small in the plurality of transmitting antennas.

13. The transmission power control method as defined in claim 10, wherein, when a sum of the transmission power ($P_{TXn}$) of each transmitting antenna exceeds a predetermined value ($P_{max}$), the total transmission power ($P_{TX}$) is made $P_{max}$, and power is set only with respect to an antenna of minimum path loss (PL) in the plurality of transmitting antennas.

14. A transmission power control method to control uplink transmission power of a mobile station apparatus having a plurality of transmitting antennas, the transmission power control method comprising the steps of:
measuring path loss (PL) of each of the plurality of transmitting antennas;
setting representative value path loss (PL') based on a measured path loss (PL) measurement value; and
determining transmission power ($P_{TXn}$) of each transmitting antenna using following equation 9 and equation 10, using the path loss (PL) measurement value measured in each transmitting antenna and the representative value path loss (PL'):

$$P_{TXb}=\min\{P_{max\_n}, 10\log_{10}(M_{PUSCH}(i))+P_{0\_PUSCH}(j)+\alpha(j)\cdot PL_b+\Delta_{TF}(i)+f(i)-10\log_{10}N\}(\text{decibel-milliwatts dBm})) \quad (\text{Equation 9})$$

where Pmax_n is maximum transmission power of each transmitting antenna, $M_{PUSCH}$ is a transmission bandwidth, $P_{0\_PUSCH}$ is target received power, $\alpha$ is a fractional TPC weighting coefficient, $\Delta_{TF}$ is an offset that relies upon MCS, and f(i) is a correction value by a TPC command, $$P_{TXn} = P_{TXb} + \beta(PL_n - PL') \quad \text{(Equation 10)}$$

where $\beta$ is a weighting coefficient.

15. The transmission power control method as defined in claim 14, wherein the representative value path loss (PL') is an average value of path loss values of the plurality of transmitting antennas.

16. The transmission power control method as defined in claim 14, wherein the representative value path loss (PL') is a minimum path loss value in path loss values of the plurality of transmitting antennas.

17. The transmission power control method as defined in claim 14, wherein the representative value path loss is a path loss value of one predetermined transmitting antenna in the plurality of transmitting antennas.

18. A mobile station apparatus comprising:
a plurality of transmitting antennas;
a path loss measurement section configured to measure path loss (PL) of the plurality of transmitting antennas; and
a transmission power setting section configured to determine transmission power ($P_{TXn}$) of each transmitting antenna based on measured path loss (PL) measurement values,
wherein the transmission power setting section sets representative value path loss (PL') based on the path loss (PL) measurement values measured in the path loss measurement section, determines total transmission power ($P_{TX}$) of the mobile station apparatus based on the representative value path loss (PL'), and determines transmission power ($P_{TXn}$) of each transmitting antenna by distributing the total transmission power ($P_{TX}$) to the plurality of transmitting antennas, and
the total transmission power ($P_{TX}$) is determined by following equation 1:

$$P_{TX} = \min\{P_{max}, 10\log_{10}(M_{PUSCH}(i)) + P_{0\_PUSCH}(j) + \alpha(j) \cdot PL' + \Delta_{TF}(i) + f(i)\} \text{(decibel-milliwatts (dBm))} \quad \text{(Equation 1)}$$

where $P_{max}$ is maximum transmission power, $M_{PUSCH}$ is a transmission bandwidth, $P_{0\_PUSCH}$ is target received power, $\alpha$ is a fractional TPC weighting coefficient, PL' is representative value path loss (PL') that is determined based on a measured a path loss (PL) measurement value, $\Delta_{TF}$ is an offset that relies upon MCS, and f(i) is a correction value by a TPC command.

19. The mobile station apparatus as defined in claim 18, wherein the representative value path loss (PL') is a minimum path loss (PL) measurement value in path loss (PL) measurement values of the plurality of transmitting antennas.

20. The mobile station apparatus as defined in claim 18, wherein the representative value path loss (PL') is a path loss (PL) measurement value of one predetermined transmitting antenna in the plurality of transmitting antennas.

21. The mobile station apparatus as defined in claim 18, wherein the total transmission power ($P_{TX}$) is evenly distributed to each of the plurality of transmitting antennas.

22. A mobile station apparatus comprising:
a plurality of transmitting antennas;
a path loss measurement section configured to measure path loss (PL) of the plurality of transmitting antennas; and
a transmission power setting section configured to determine transmission power ($P_{TXn}$) of each transmitting antenna based on measured path loss (PL) measurement values,
wherein the transmission power setting section determines transmission power ($P_{TXn}$) of each transmitting antenna by following equation 6 based on the path loss (PL) measurement value of each transmitting antenna measured in the path loss measurement section:

$$P_{TXn} = \min\{P_{max\_n}, 10\log_{10}(M_{PUSCH}(i)) + P_{0\_PUSCH}(j) + \alpha(j) \cdot PL_n + \Delta_{TF}(i) + f(i) - 10\log_{10}N\} \text{(decibels-milliwatt (dBm))} \quad \text{(Equation 6)}$$

where Pmax_n is maximum transmission power of each transmitting antenna $M_{PUSCH}$ is a transmission bandwidth, $P_{0\_PUSCH}$ is target received power, $\alpha$ is a fractional TPC weighting coefficient, $\Delta_{TF}$ is an offset that relies upon MCS, and f(i) is a correction value by a TPC command.

23. The mobile station apparatus as defined in claim 22, wherein, when a sum of the transmission power of the plurality of transmitting antenna exceeds a predetermined value ($P_{max}$), the total transmission power ($P_{TX}$) of the mobile station apparatus is made $P_{max}$ and the transmission power ($P_{TXn}$) of each transmitting antenna is determined using following equation 7:

$$P_{TXn'} = P_{max} - 10\log_{10}N \text{(dBm)} \quad \text{(Equation 7)}$$

where N is the number of transmitting antennas.

24. The mobile station apparatus as defined in claim 22, wherein, when a sum of the transmission power ($P_{TXn}$) of each transmitting antenna exceeds a predetermined value ($P_{max}$), the total transmission power ($P_{TX}$) is made $P_{max}$, and $P_{max}$ is preferentially distributed to an antenna where path loss (PL) is small in the plurality of transmitting antennas.

25. The mobile station apparatus as defined in claim 22, wherein, when a sum of the transmission power ($P_{TXn}$) of each transmitting antenna exceeds a predetermined value ($P_{max}$), the total transmission power ($P_{TX}$) is made $P_{max}$, and power is set only with respect to an antenna of minimum path loss (PL) in the plurality of transmitting antennas.

* * * * *